United States Patent
Yang et al.

(10) Patent No.: US 7,912,231 B2
(45) Date of Patent: Mar. 22, 2011

(54) SYSTEMS AND METHODS FOR REDUCING AUDIO NOISE

(75) Inventors: Jun Yang, San Jose, CA (US); Rick Oliver, Capistrano Beach, CA (US)

(73) Assignee: SRS labs, Inc., Santa Ana, CA (US)

(*) Notice: Subject to any disclaimer, the term of this patent is extended or adjusted under 35 U.S.C. 154(b) by 1370 days.

(21) Appl. No.: 11/408,488

(22) Filed: Apr. 21, 2006

(65) Prior Publication Data

US 2006/0256764 A1  Nov. 16, 2006

Related U.S. Application Data

(60) Provisional application No. 60/673,671, filed on Apr. 21, 2005.

(51) Int. Cl.
H04B 15/00 (2006.01)
(52) U.S. Cl. .................. 381/94.2; 381/94.1; 381/94.3; 381/94.8
(58) Field of Classification Search ........ 381/94.1–94.3, 381/94.8, 71.14
See application file for complete search history.

(56) References Cited

U.S. PATENT DOCUMENTS

| | | | |
|---|---|---|---|
| 4,628,529 A | 12/1986 | Borth et al. |
| 4,630,305 A | 12/1986 | Borth et al. |
| 4,630,604 A | 12/1986 | Montesi |
| 5,012,519 A | 4/1991 | Adlersberg et al. |
| 5,706,394 A | 1/1998 | Wynn |
| 5,933,495 A | 8/1999 | Oh |
| 5,937,060 A | 8/1999 | Oh |
| 6,289,309 B1 | 9/2001 | de Vries |
| 6,415,253 B1 | 7/2002 | Johnson |
| 6,523,003 B1 | 2/2003 | Chandran et al. |
| 6,529,868 B1 | 3/2003 | Chandran et al. |
| 6,671,667 B1 | 12/2003 | Chandran et al. |
| 6,760,435 B1 | 7/2004 | Etter et al. |
| 6,766,292 B1 | 7/2004 | Chandran et al. |
| 6,810,273 B1 | 10/2004 | Mattila et al. |
| 6,980,665 B2 | 12/2005 | Kates |
| 2002/0193130 A1 | 12/2002 | Yang et al. |
| 2003/0040908 A1 | 2/2003 | Yang et al. |
| 2003/0101055 A1 | 5/2003 | Son et al. |
| 2003/0135364 A1 | 7/2003 | Chandran et al. |
| 2003/0220786 A1 | 11/2003 | Chandran et al. |
| 2004/0078200 A1 | 4/2004 | Alves |
| 2004/0148166 A1 | 7/2004 | Zheng |
| 2005/0027520 A1 | 2/2005 | Matilla et al. |
| 2005/0143988 A1 | 6/2005 | Endo et al. |
| 2005/0278172 A1 | 12/2005 | Koishida et al. |

(Continued)

OTHER PUBLICATIONS

Yamashita Yukihiko., "*Optimum Sampling Vectors for Wiener Filter Noise Reduction*", Jan. 2002, vol. 50, Issue 1.

(Continued)

*Primary Examiner* — Vivian Chin
*Assistant Examiner* — George Monikang
(74) *Attorney, Agent, or Firm* — Knobbe, Martens, Olson & Bear, LLP

(57) ABSTRACT

Various embodiments of systems and methods for reducing audio noise are disclosed. One or more sound components such as noise and network tone can be detected based on power spectrum obtained from a time-domain signal. Results of such detection can be used to make decisions in determination of an adjustment spectrum that can be applied to the power spectrum. The adjusted spectrum can be transformed back into a time-domain signal that substantially removes undesirable noise(s) and/or accounts for known sound components such as the network tone.

19 Claims, 7 Drawing Sheets

U.S. PATENT DOCUMENTS

2006/0008101 A1    1/2006    Kates

OTHER PUBLICATIONS

Martin Rainer, "*Spectral Subtraction Based on Minimum Statistics*", Sep. 1994, pp. 1182-1185, EUSIPCO-94, Edinburgh, Scotland.

David Malah, et al., "*Tracking Speech-Presence Uncertainty to Improve Speech Enhancement in Non-stationary Noise Environments*", ICASSP, 1999, vol. 2 pp. 789-792.

Virginie Gilg, et al., "*Methodology for the Design of a Robust Voice Activity Detector for Speech Enhancement*", pp- 131-134, IWAENC2003, Sep. 2003, Kyoto Japan.

Stefan Schmitt, et al., "*Single Channel Noise Reduction for Hands Free Operation in Automotive Environments*", Audio Engineering Society Convention Paper, May 11-14, 2002, Munich, Germany.

Harald Gustafsson, et al., "*Spectral Subtraction Using Reduced Delay Convolution and Adaptive Averaging*"; IEEE Transactions on Speech and Audio Processing, vol. 9, No. 8, Nov. 2001, pp. 799-807.

Filiz Basbug, et al., "*Noise Reduction and Echo Cancellation Front-End for Speech Codecs*", IEEE Transactions on Speech and Audio Processing, vol. 11, No. 1, Jan. 2003, pp. 1-13.

Hirsch, H. G., "*Estimation of Noise Spectrum and its Application to SNR-Estimation and Speech Enhancement*", ICSI Technical Report TR-93-012, Intl. Comp. Science Institute, Berkeley, CA, 1993.

Y. Ephraim, et al., "*Speech Enhancement Using a Minimum Mean Square Error Short-Time Spectral Amplitude Estimator,* " IEEE Trans. Acoust., Speech, Signal Processing, vol. ASSP-32 (6), Dec. 1984, pp. 1109-1121.

Firas Jabloun, et al., "*Incorporating the Human Hearing Properties in the Signal Subspace Approach for Speech Enhancement*", IEEE Transactions on Speech and Audio Processing, vol. 11, Nov. 2003, No. 6, pp. 700-709.

SYSTEMS AND METHODS FOR REDUCING AUDIO NOISE

CLAIM OF PRIORITY

This application claims the benefit of U.S. Provisional Application No. 60/673,671 filed on Apr. 21, 2005, entitled "SYSTEMS AND METHODS FOR REDUCING AUDIO NOISE," which is hereby incorporated by reference herein in its entirety.

BACKGROUND

1. Field

The present disclosure generally relates to signal processing, and more particularly, to systems and methods for reducing audio noise in signals such as speech communication signals.

2. Description of the Related Art

Background noise and interference sounds can degrade speech quality and intelligibility in speech communication systems. The presence of background noise and interference sound in the absence of speech can also be annoying.

To address these problems, many speech enhancement and noise reduction (NR) techniques have been proposed with a hope that improving the signal-to-noise ratio (SNR) would improve speech quality and intelligibility. However, there is a conflict between improving SNR and speech quality. Although improving SNR makes speech sound less noisy, artifacts or distortions associated with many available noise reduction and speech enhancement algorithms can degrade speech quality, thereby making speech sound less pleasant as well.

SUMMARY

At least some of the foregoing problems can be addressed by various embodiments of systems and methods for reducing audio noise as disclosed herein. One or more sound components such as noise and network tone can be detected based on power spectrum obtained from a time-domain signal. Results of such detection can be used to make decisions in determination of an adjustment spectrum that can be applied to the power spectrum. The adjusted spectrum can be transformed back into a time-domain signal that substantially removes undesirable noise(s) and/or accounts for known sound components such as the network tone.

One embodiment of the present disclosure relates to a system for reducing audio noise. The system includes an input component configured so as to receive an input time-domain signal and generate an input frequency-domain signal and a power spectrum of the input frequency-domain signal. The system further includes at least one detection component. Each detection component is configured so as to detect presence of a selected sound component in the power spectrum. The system further includes an adjustment component configured so as to generate an adjustment power spectrum based on detection of the presence of the at least one selected sound component and combine the adjustment power spectrum with the input frequency-domain signal so as to generate an output frequency-domain signal. The system further includes an output component configured so as to generate an output time-domain signal based on the output frequency-domain signal.

In one embodiment, the input time-domain signal includes speech communication signal.

In one embodiment, the at least one detection component includes at least one of a noise-activity detector, a white-noise detector, and a network-tone detector. In one embodiment, the power spectrum has N frequency bins and corresponding to N sampled values of the input time-domain signal.

In one embodiment, the noise-activity detector is configured so as to compare magnitudes of one or more groups the N frequency bins with corresponding selected values and generate a noise-activity indicator indicating presence or absence of noise-activity in the power spectrum. In one embodiment, the noise-activity detector is configured so as to: partition the N frequency bins into a plurality of bands; obtain a magnitude value for each of the plurality of bands; compare the magnitude value with a threshold value for each of the plurality of bands; and determine presence of the noise-activity if the magnitude value exceeds the threshold value for a selected number of the plurality of bands.

In one embodiment, the white-noise detector is configured so as to: obtain a current energy value based on a sum of the N frequency bins; obtain a difference between the current energy value from a previous energy value, the difference having a positive value; and generate a white-noise indicator indicating presence of white-noise in the power spectrum if the difference is greater than a selected value.

In one embodiment, the network-tone detector is configured so as to: identify a selected bin having the maximum value from the N frequency bins; and generate a network-tone indicator indicating presence of network-tone in the power spectrum if the selected bin satisfies one or more conditions. In one embodiment, the network-tone indicator is generated if the selected bin has not changed by more than a selected amount and if the selected bin is within a range of frequency corresponding to the network-tone.

In one embodiment, the adjustment power spectrum includes an estimated power spectrum that is adjusted based on the detection of one or more of the selected sound components. In one embodiment, the adjustment of the estimated power spectrum includes scaling the estimated power spectrum by a selected amount if network-tone is not detected by the network-tone detector and noise-activity is detected by the noise-activity detector. In one embodiment, the adjustment of the estimated power spectrum further includes adjusting for white-noise if network-tone is not detected by the network-tone detector and the white-noise is detected by the white-noise detector.

In one embodiment, the system further includes a re-convergence component configured so as to allow by-passing of the at least one detection component and the adjustment component based on the input time-domain signal. In one embodiment, the by-passing is performed if a selected value representative of the input time-domain signal remains less than a threshold value for a selected period of time. In one embodiment, the threshold value is substantially zero.

One embodiment of the present disclosure relates to a method for reducing audio noise. The method includes receiving an input time-domain signal and generating an input frequency-domain signal and a power spectrum of the input frequency-domain signal. The method further includes detecting presence of one or more sound components in the power spectrum. The method further includes generating an adjustment power spectrum based on detection of the presence of the one or more sound components. The method further includes combining the adjustment power spectrum with the input frequency-domain signal so as to generate an output frequency-domain signal. The method further includes generating an output time-domain signal based on the output frequency-domain signal.

In one embodiment, the input time-domain signal includes speech communication signal.

In one embodiment, the one or more sound components include at least one of a noise-activity, a white-noise, and a network-tone. In one embodiment, the power spectrum has N frequency bins and corresponding to N sampled values of the input time-domain signal.

In one embodiment, the noise-activity is detected by comparing magnitudes of one or more groups the N frequency bins with corresponding selected values and generating a noise-activity indicator indicating presence or absence of the noise-activity in the power spectrum. In one embodiment, the noise-activity is detected by: partitioning the N frequency bins into a plurality of bands; obtaining a magnitude value for each of the plurality of bands; comparing the magnitude value with a threshold value for each of the plurality of bands; and determining presence of the noise-activity if the magnitude value exceeds the threshold value for a selected number of the plurality of bands.

In one embodiment, the white-noise is detected by: obtaining a current energy value based on a sum of the N frequency bins; obtaining a difference between the current energy value from a previous energy value, the difference having a positive value; and generating a white-noise indicator indicating presence of white-noise in the power spectrum if the difference is greater than a selected value.

In one embodiment, the network-tone is detected by: identifying a selected bin having the maximum value from the N frequency bins; and generating a network-tone indicator indicating presence of network-tone in the power spectrum if the selected bin satisfies one or more conditions. In one embodiment, the network-tone indicator is generated if the selected bin has not changed by more than a selected amount and if the selected bin is within a range of frequency corresponding to the network-tone.

In one embodiment, the adjustment power spectrum includes an estimated power spectrum that is adjusted based on the detection of one or more of the sound components. In one embodiment, the adjustment of the estimated power spectrum includes scaling the estimated power spectrum by a selected amount if the network-tone is not detected and the noise-activity is detected. In one embodiment, the adjustment of the estimated power spectrum further includes adjusting for the white-noise if the network-tone is not detected and the white-noise is detected.

In one embodiment, the method further includes by-passing of the detecting based on the input time-domain signal. In one embodiment, the by-passing is performed if a selected value representative of the input time-domain signal remains less than a threshold value for a selected period of time. In one embodiment, the threshold value is substantially zero.

One embodiment of the present disclosure relates to a system for reducing audio noise. The system includes an input component configured so as to receive an input signal and generate a power spectrum corresponding to the input signal, where the input signal has a signal-to-noise ratio. The system further includes a detector configured so as to detect presence of one or more sound components in the power spectrum. The detection is performed while maintaining the signal-to-noise ratio of the input signal at a substantially the same level.

One embodiment of the present disclosure relates to a system for reducing audio noise. The system includes means for generating a power spectrum corresponding to an input signal. The system further includes means for detecting one or more sound components in the power spectrum. The system further includes means for adjusting the input signal based on detection of the one or more sound components.

BRIEF DESCRIPTION OF THE DRAWINGS

These and other aspects, advantages, and novel features of the present teachings will become apparent upon reading the following detailed description and upon reference to the accompanying drawings. In the drawings, similar elements have similar reference numerals.

DETAILED DESCRIPTION OF SOME EMBODIMENTS

The present disclosure generally relates to noise reduction technology. In some embodiments, various features and techniques of the present disclosure can be implemented on speech communication devices such as telephonic devices (wireless or wire-based), radio-based devices, hearing aids, and the like.

Figure 1:
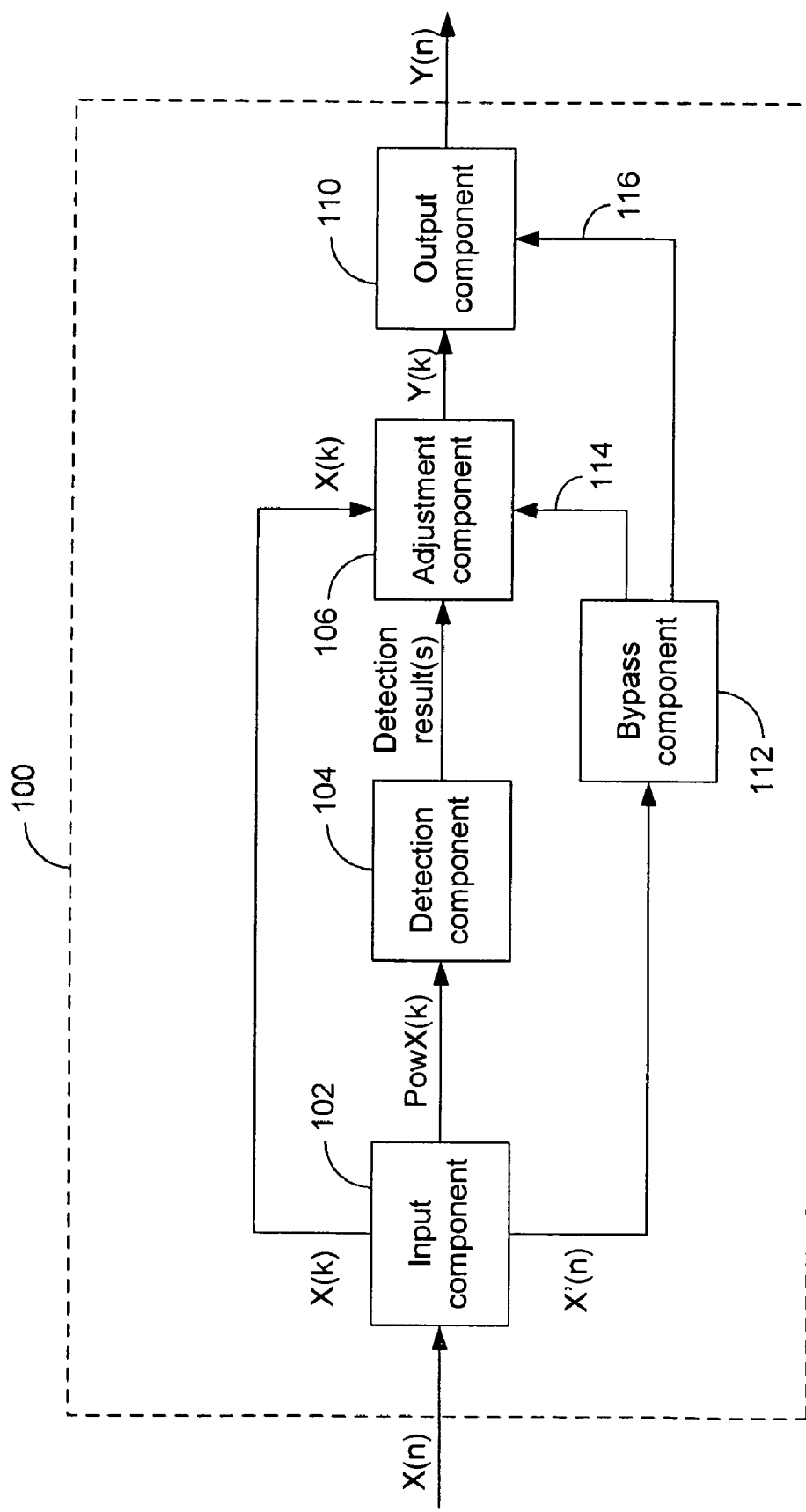
FIG. 1 shows a block diagram of one embodiment of a system having various components configured to identify one or more sound components in a signal such as an audio communication signal.

FIG. 1 shows a block diagram of one embodiment of a system 100 having various components that facilitate detection of one or more selected sound components present in an input signal, and adjustment of the input signal based on such detected sound components. In one embodiment, the selected sound components can include noise. In one embodiment, the selected sound components can include artificially introduced sound such as a network tone.

For the purpose of description herein, a time-domain signal is indicated as S(n), and a frequency-domain counterpart is indicated as S(k). The S(k) includes both magnitude and phase information; and thus can be referred to as a vector quantity or a complex signal. The squared magnitude portion of S(k) is commonly referred to as a power spectrum, and indicated as PowS(k). For the purpose of description herein, a "power spectrum" can be obtained from the magnitude, square-of-magnitude, or any magnitude-based quantity.

Thus, as shown in FIG. 1, one embodiment of the system 100 receives an input signal X(n), obtains a complex signal X(k), determines a power spectrum PowX(k) of X(k), determines an adjustment power spectrum PowA(k) based on PowX(k), and adjusts X(k) based on the adjustment power spectrum PowA(k) to yield an adjusted complex signal Y(k). The adjusted complex signal Y(k) can be converted back to its time-domain counterpart Y(n).

In one embodiment, the system 100 includes an input component 102, a detection component 104, an adjustment component 106, and an output component 110 that can provide the foregoing functionalities. In one embodiment, the system can also include a bypass component 112. These components are described below in greater detail.

In some embodiments, functionalities of various features are described herein as being achieved or facilitated by a processor, a component, and/or a module. For the purpose of description herein, a processor can include one or more processing devices and/or one or more processes. Similarly, a component or a module can include one or more devices and/or one or more processes.

Also, different components can exist either as separate devices or as part of a same device. Moreover, some of the components can exist as part of one device while other component(s) is (are) part of one or more devices.

As shown in FIG. 1, the input signal X(n) is shown to be received by the input component 102 that generates a corresponding complex signal X(k) and its power spectrum PowX (k). The power spectrum PowX(k) is shown to be received by the detection component 104 that generates one or more detection results. The one or more detection results are shown to be received by the adjustment component 106 that generates an adjustment power spectrum PowA(k) based on the one or more detection results. The adjustment power spectrum PowA(k) can be combined with the complex signal X(k) so as to yield an adjusted complex signal Y(k). The adjusted complex signal Y(k) is shown to be received by the output component 110 that generates an output time-domain signal Y(n) corresponding to the adjusted complex signal Y(k).

In one embodiment, as shown in FIG. 1, the input component 102 can provide a signal X'(n), that may or may not be the same as the input X(n), to the bypass component 112 that can determine whether adjustment to X(k) is to be made (indicated by an arrow 114) or to reset system states and bypass the adjustment process (indicated by an arrow 116).

Figure 2:
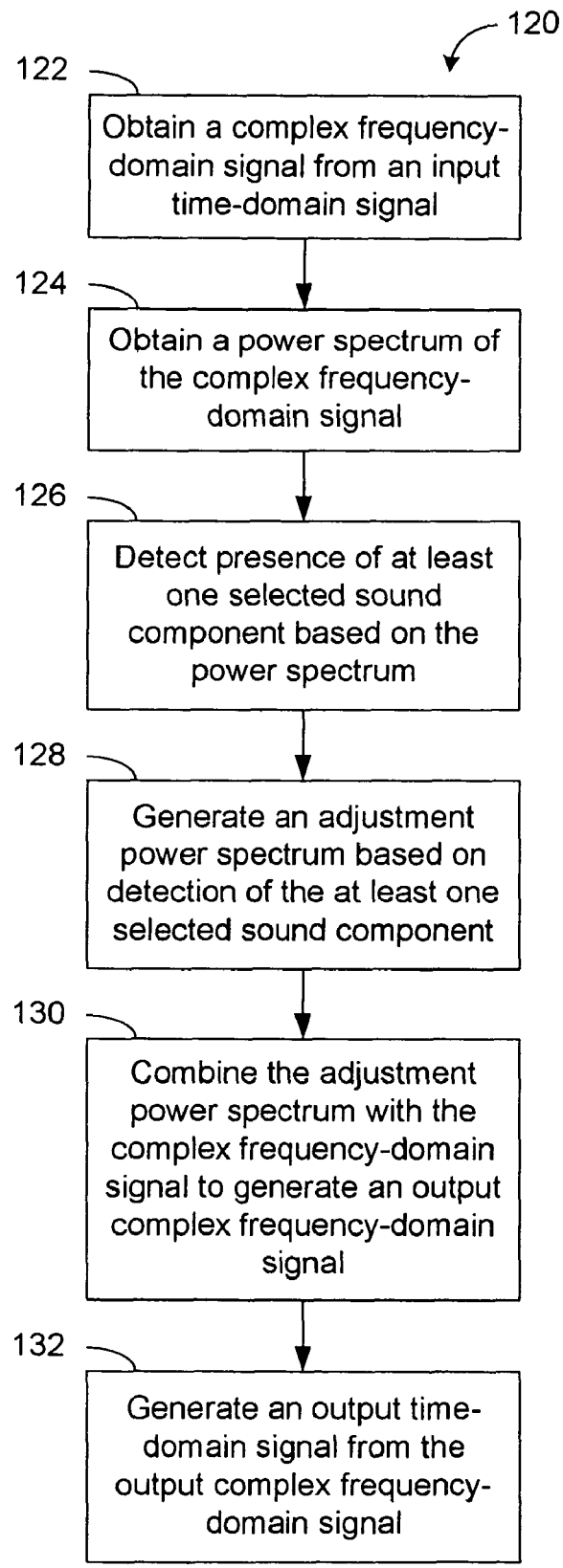
FIG. 2 shows one embodiment of a process that can be performed by the system of FIG. 1.

FIG. 2 shows one embodiment of a process 120 that can be performed by one embodiment of the system 100 of FIG. 1. In a process block 122, a complex frequency-domain signal is obtained from an input time-domain signal. In a process block 124, a power spectrum of the complex frequency-domain signal is obtained. In a process block 126, presence of at least one selected sound component is detected based on the power spectrum. In a process block 128 an adjustment power spectrum is generated based on the detection of the at least one selected sound component. In a process block 130, the complex frequency-domain signal is combined with the adjustment power spectrum to generate an output complex frequency-domain signal. In a process block 132, an output time-domain signal is generated from the output complex frequency-domain signal.

Figure 3:
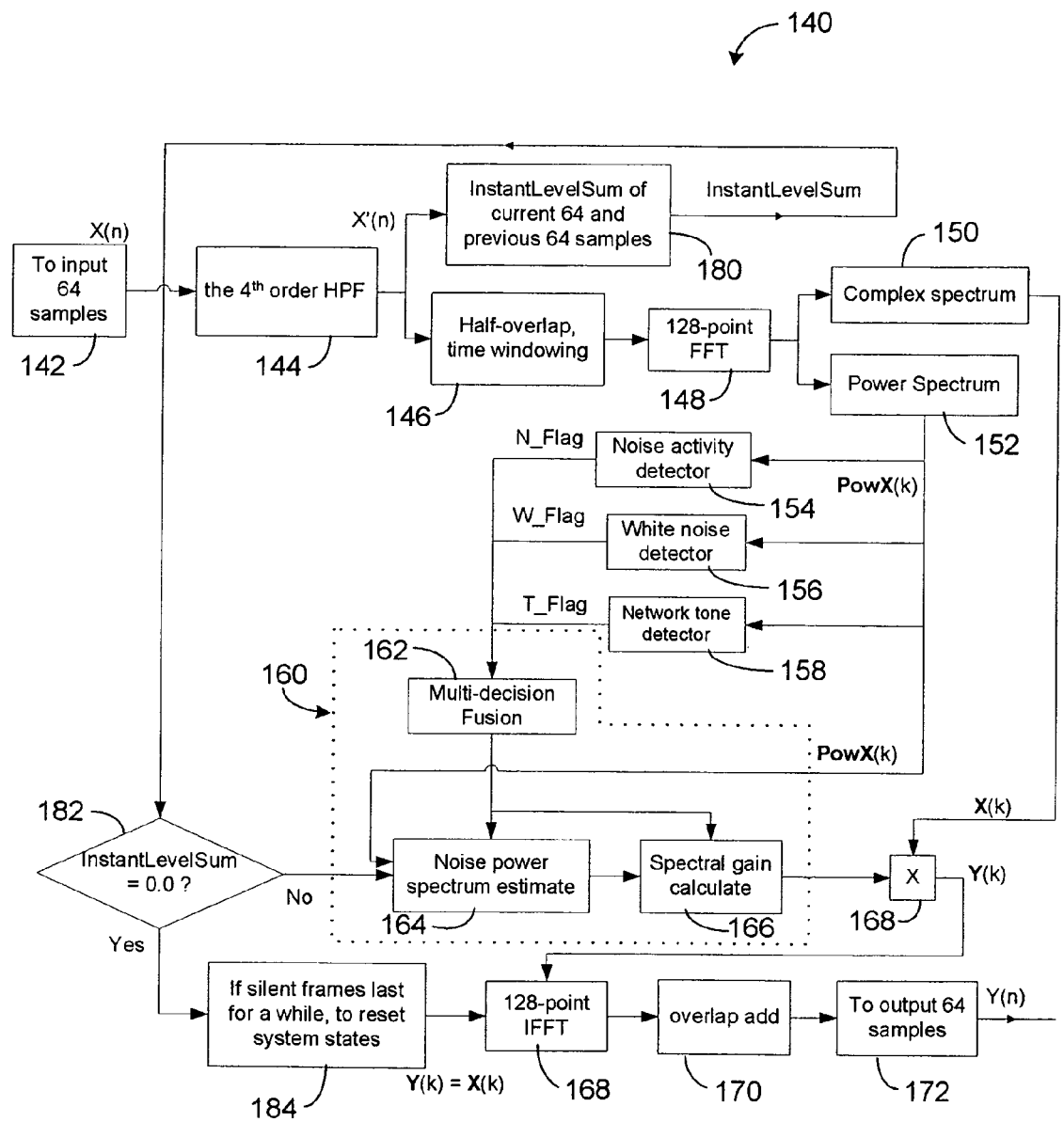
FIG. 3 shows one example embodiment of the system of FIG. 1.

FIG. 3 shows one example embodiment of the system 100 that can perform the process 120 of FIG. 2. In the example of FIG. 3, the various components described above in reference to FIG. 1 are not necessarily identified. It will be understood, however, that various functionalities of the process 120 can be achieved by the example shown in FIG. 3.

In one embodiment, an input time-domain signal can be sampled as frames. The example configuration shown in FIG. 3 follows processing of a frame 142 of the input signal. For the purpose of description herein, it will be assumed that the input frame 142 has 64 sample values for the case of an example 8 kHz sampling rate. However, it will be understood that other sampling values are possible.

In FIG. 3, the input frame of the signal is depicted as X(n). In the description herein, X(n) is sometimes referred to as simply the input signal or input time-domain signal.

In one embodiment, the input signal X(n) can be filtered to remove certain noise(s). For example, high-pass filtering (HPF, depicted as block 144) can be performed to filter out DC component and some low frequency noise.

Figure 4A:
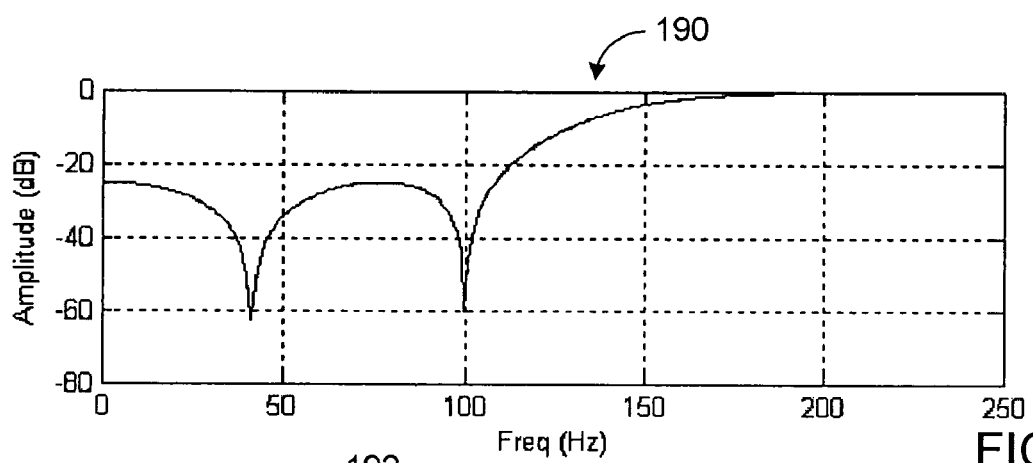
FIGS. 4A and 4B show an example response of an example filtering component that can be used to condition the signal for further processing.
Figure 4B:
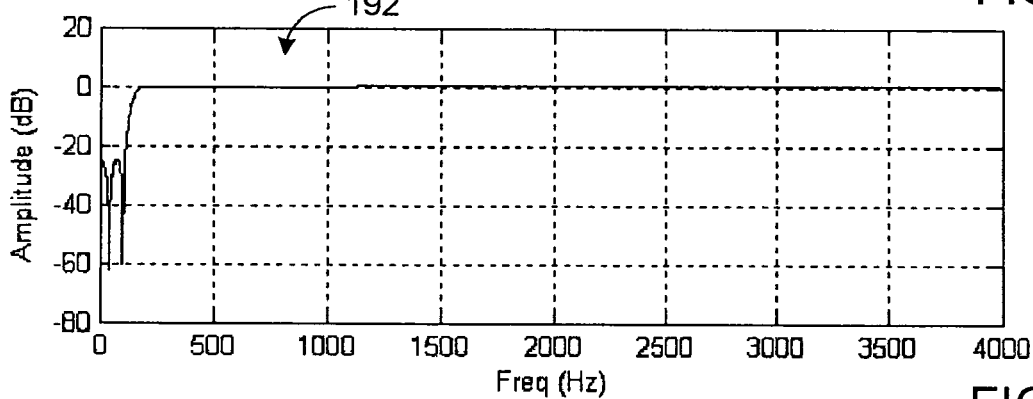

In some applications, such as Digital Enhanced Cordless Telecommunications (DECT) system, the input signal can have a tonal noise at about 100 Hz. To handle such an example noise, the example HPF 144 can be configured to have a valley at about 100 Hz in its frequency response, as shown in FIGS. 4A and 4B.

In one embodiment, the filtered signal X'(n) can be decomposed into a frame of N samples (N=128) with an N/2-sample overlap. In one embodiment, such frame can undergo hanning windowing (block 146) and 128-FFT (block 148) to obtain a complex signal (also referred to as complex spectrum) X(k) (block 150).

In one embodiment, as further shown in FIG. 3, a power spectrum PowX(k) (k=1, 2, ..., N/2) can be obtained (block 152) based on the N-point FFT (block 148), where k represents the frequency bin with a value of $k*f_s/N$ (Hz), with $f_s$ being the sampling rate.

Based on the input power spectrum PowX(k), example detectors—noise activity detector (block 154), white noise detector (block 156), and network tone detector (block 158)—can determine noise activity, white noise, and network tone. Based on such determination, the detectors 154, 156, and 158 can generate output flags N_Flag, W_Flag, and T_Flag, respectively. These example detectors are described below in greater detail.

In one embodiment, the noise activity detector 152 and the white noise detector can be designed for the residual noise reduction. In one embodiment, the output(s) from any one of or any combination of the noise activity detector 154, white noise detector 156, and network tone detector 158 can be used for noise power estimation and its spectral gain estimation. For example, in one embodiment, outputs from all three detectors 154, 156, 158 can be used for noise power estimation and its spectral gain estimation. In one embodiment, the output from the network tone detector 158 can be used for noise power estimation and its spectral gain estimation.

In one embodiment, as further shown in FIG. 3, the outputs of the detectors 154, 156, and 158 (including their respective output flags) are shown to be provided to an adjustment power spectrum generator 160. The power spectrum PowX(k) is also shown to be provided to the adjustment power spectrum generator 160.

The adjustment power spectrum generator 160 is shown to include functionalities that include multi-decision fusion (block 162), noise power spectrum estimation (164), and spectral gain estimation (block 166). Although FIG. 3 shows a particular example "flow" (by way of example arrows), it will be understood that the various functionalities of the adjustment power spectrum generator 160 do not necessarily follow such path(s).

In one embodiment, the adjustment power spectrum generator 160 first generates an estimate of a noise power spectrum 164. In one embodiment, the noise power spectrum can be estimated by the following example technique: (1) obtain power spectra for M frames (for example, M=8, including the current frame PowX(k) and the 7 previous frames); for each frequency bin, obtain the minimum value among the M frames; and form the estimated noise power spectrum by collecting the minimum values of the frequency bins. For example, if bin-1 has a minimum value of 2.2 from frame-7, bin-2 has a minimum value of 1.5 from frame-2, and so on, then the estimated noise power spectrum will have values 2.2 for bin-1, 1.5 for bin-2, and so on.

In one embodiment, the adjustment power spectrum generator 160 adjusts the estimated noise power spectrum (164) by spectral gain (166). The spectral gain can be determined based on some known technique, and/or based on some decision(s) (162) involving the outputs of the detectors 154, 156, and 158. For example, spectral gain (mSpectralGain(k) for each bin) can be calculated based on the approach shown in "*Speech enhancement using a minimum mean square error short-time spectral amplitude estimator,*" by Y. Ephraim and D. Malah, *IEEE Trans. Acoust., Speech, Signal Processing*, vol. ASSP-32 (6), pp. 1109-1121, December 1984, the entirety of which is hereby incorporated herein by reference. An example of the detection-based determination of gains for adjusting the noise power spectrum is described below in greater detail.

In one embodiment, as further shown in FIG. 3, the input complex spectrum X(k) (from block 150) can undergo frequency-domain filtering (block 166) where the spectral gain thus obtained (in block 164) is applied to X(k). For example, the spectral gain for the k-th frequency bin can be calculated as follows:

mSpectralGain(*k,m*)=Ratio(*k,m*)/[Ratio(*k,m*)+1], *k*=1, 2, . . . , 64, where Ratio(*k,m*)=α*mSpectralGain(*k,m*−1)*Pow*X*(*k*) *γ+(1−α)*P[Pow*X*(*k*)].

The parameter α is a so-called "forgetting factor" (0<α<1, α=0.98 is one example); γ is a constant (for example, 0.0243). P[PowX(k)] is a rectifying function, where one example can be max(0.0, PowX(k)*γ/EstimatedNoisePow(k)−1). In this example, mSpectralGain(k, 0) is initialized as zero. An output of the filtering 166 is shown to be an output complex spectrum (also referred to as complex signal) Y(k).

In one embodiment, as further shown in FIG. 3, the output complex spectrum Y(k) can be processed further by, for example, N-point IFFT (block 168) to map onto time domain. In one embodiment, an overlap-add (block 170) technique can be used to reconstruct a frame of samples (block 172) that represents a noise-reduced time-domain signal Y(n).

In one embodiment, as further shown in FIG. 3, a bypass or a re-convergence mechanism can work as follows. A summation of the absolute value of the X'(n) frame, InstantLevelSum, can be calculated in block 180. Similar value(s) for one or more previous frame(s) can also be obtained. A decision block 182 determines whether the value InstantLevelSum=0.0 or less than a selected value for a certain period (for example, 80 ms), based on the current value and the one or more previous values. If "Yes," then system states can be reset, and the noise reduction processing can be bypassed. In such a situation, Y(k) can be assigned X(k), and be processed so as to generate Y(n) as described above. If "No," the noise power spectrum estimation and/or the spectral gain determination can be performed based on the power spectrum PowX (k) as described above.

Figure 5:
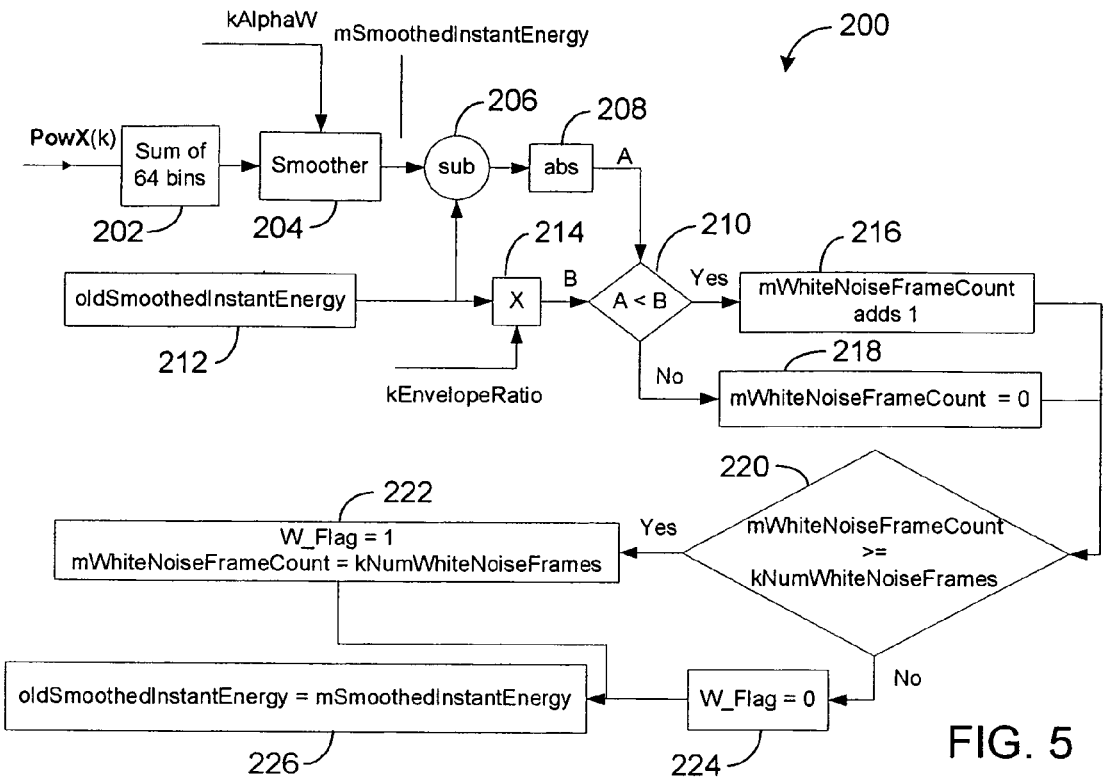
FIG. 5 shows one embodiment of a detector component that can be configured to detect white noise in a power spectrum corresponding to the signal.

FIG. 5 shows one embodiment of the white noise detector 200 described above in reference to FIG. 3 (156). A summing component 202 is shown to receive the power spectrum PowX(k) and sum the bins (in this example, 64 bins), and provide the sum $$\sum_{k=1}^{64} PowX(k)$$

to a smoother 204. The smoother 204 is shown to receive a parameter kAlphaW and the sum $$\sum_{k=1}^{64} PowX(k)$$

to generate a quantity mSmoothedInstantEnergy that can be expressed as $$mSmoothedInstantEnergy = \\ kAlphaW * mSmoothedInstantEnergy + (1 - kAlphaW) * \sum_{k=1}^{64} PowX(k).$$

In one embodiment, the parameter kAlphaW has a value of about 0.94818, and the quantity mSmoothedInstantEnergy is initialized as zero.

As further shown in FIG. 5, an absolute value (208) of the difference (206) between mSmoothedInstantEnergy and an old value oldSmoothedInstantEnergy is depicted as having a value "A." A value "B" is defined as a product (214) of oldSmoothedInstantEnergy and a parameter kEnvelopeRatio. In one embodiment, kEnvelopeRatio has a value of about 0.0284. The values A and B are compared in a decision block 210. If A is less than B, then a counter m WhiteNoiseFrameCount (which is initialized as zero) is incremented by 1 (216). Otherwise, the counter m WhiteNoiseFrameCount is re-set to zero (218).

As further shown in FIG. 5, the current value of the counter mWhiteNoiseFrameCount is compared to a selected count value kNumWhiteNoiseFrames in a decision block 220. In one embodiment, kNumWhiteNoiseFrames has a value of 38. If mWhiteNoiseFrameCount is greater than or equal to kNumWhiteNoiseFrames, then white noise is considered to exist, and the flag W_Flag is set at an example value of "1" (222). The counter m WhiteNoiseFrameCount is also set to the value kNumWhiteNoiseFrames. If mWhiteNoiseFrameCount is less than kNumWhiteNoiseFrames, then the existence of white noise is not declared, and the flag W_Flag is set at "0" (224). The current value mSmoothedInstantEnergy now becomes the old value oldSmoothedInstantEnergy (226) for analysis of the next frame.

Figure 6:
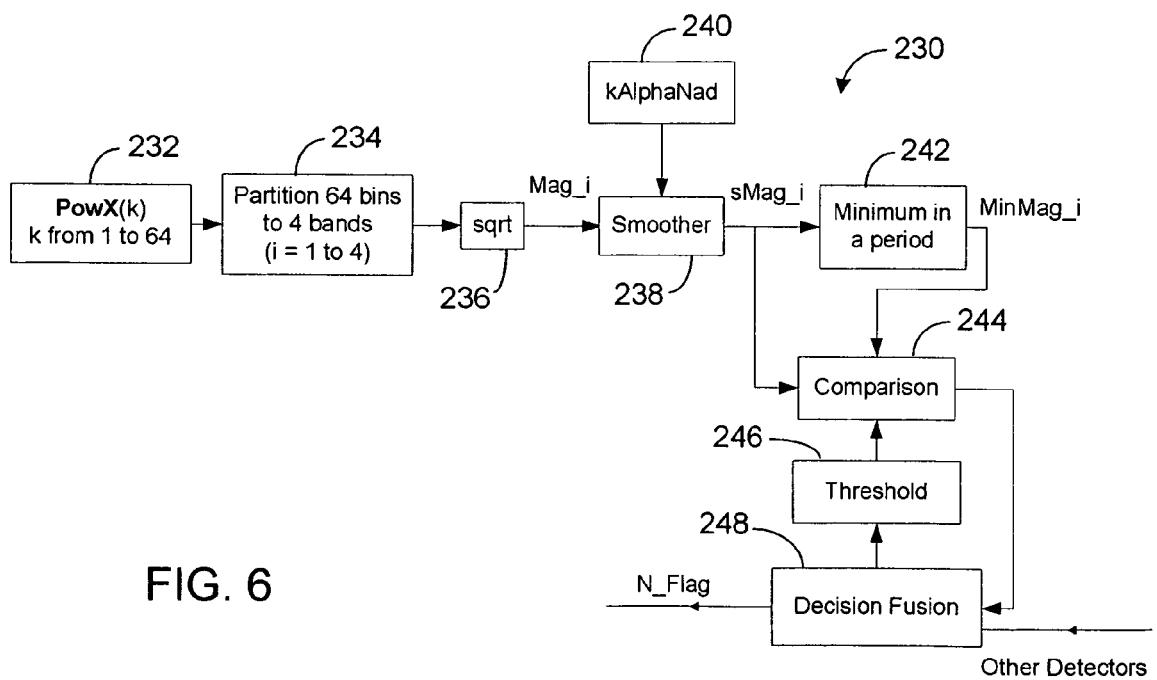
FIG. 6 shows one embodiment of a detector component that can be configured to detect noise activity in a power spectrum corresponding to the signal.

FIG. 6 shows one embodiment of the noise activity detector 230 described above in reference to FIG. 3 (154). The power spectrum PowX(k) (232) with the example 64 bins is shown to have the 64 bins partitioned into 4 example bands (i=1 to 4) (234). For each band (i-th band), the power summation of the in-band bins is processed by the square-root operation block 236 so as to generate a value Mag_i for the i-th band. In one embodiment, the value Mag_i is provided to a smoother block 238 that also receives a parameter kAlphaNad (240). In one embodiment, kAlphaNad has a value of about 0.55. The smoother 238 calculates a smoothed magnitude value sMag_i based on Mag_i and kAlphaNad as sMag_i=*k*AlphaNad*sMag_i+(1−*k*AlphaNad)*Mag_i.

Note that i=1 to 4 are for the four example bands. In one embodiment, the value of sMag_i is initialized with a value of about 0.925.

In one embodiment, a minimum value of sMag_i is maintained and updated for a selected period (for example, 30 frames). Thus, the current value of sMag_i from the smoother 238 can be compared with the existing minimum to see if the minimum value MinMag_i should be updated (242). The current value of sMag_i is compared (244) to a threshold value (246) (for example, a selected parameter multiplied by MinMag_i). If sMag_i is greater than the threshold value, noise activity is considered to exist, and the flag N_Flag is set to "1" for the decision fusion as described herein. Otherwise, N_Flag is set to "0."

Figure 7:
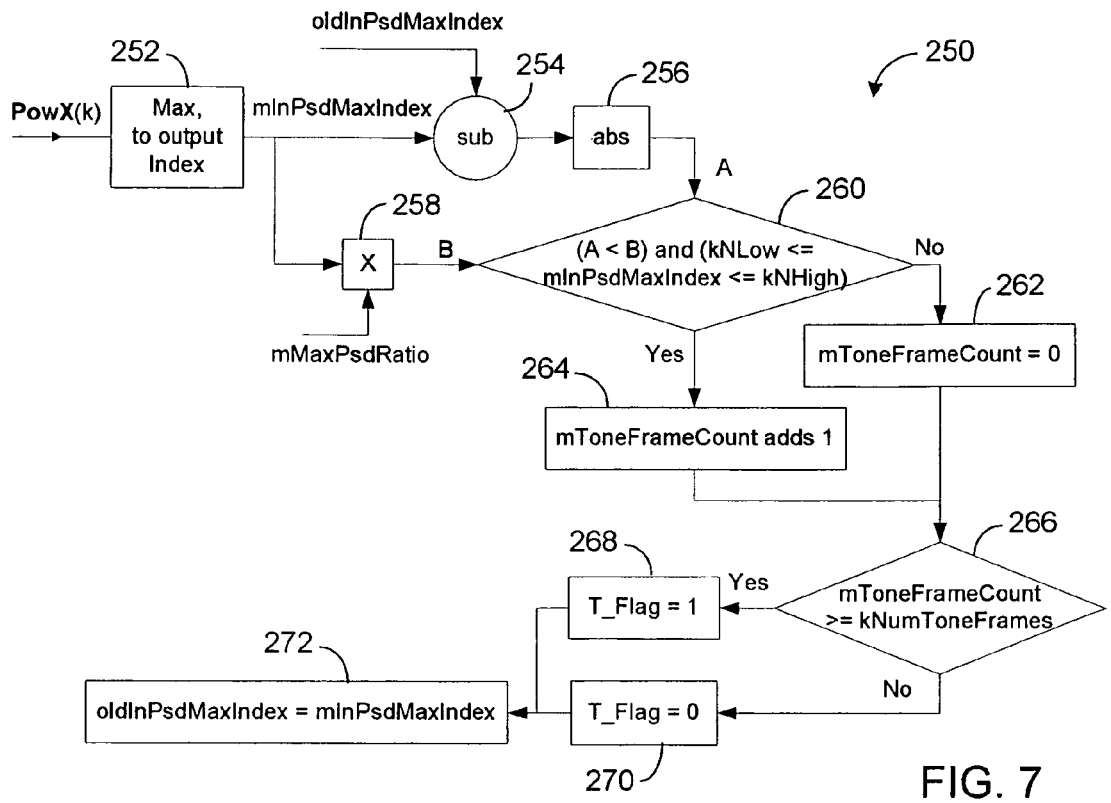
FIG. 7 shows one embodiment of a detector component that can be configured to detect network tone in a power spectrum corresponding to the signal.

FIG. 7 shows one embodiment of the network tone detector 250 described above in reference to FIG. 3 (158). As described herein, the network tone detector 250, or variations thereof, can provide a simple and effective network tone detection algorithm. One or more functionalities provided by the network tone detector 250 can also be combined with spectral subtraction based noise reduction technique, so as to achieve effective noise reduction while maintaining the network tone information in systems such as telephone systems. Moreover, the network tone detection algorithm can be generalized to be integrated with echo cancellation schemes so as to provide better echo cancellation without losing any useful information.

In one embodiment, following parameters can be defined for the purpose of describing FIG. 7. Parameter mInPsdMaxIndex is the frequency bin number for the current frame, where this bin is of the maximum energy in the example 64 frequency-bins. Parameter oldInPsdMaxIndex represents the frequency bin, which has maximum energy for the previous frame. Parameter mMaxPsdRatio is a tunable positive factor between 0.0 and 1.0. Parameters kNLow and kNHigh define a frequency range in which network tones are located; kNLow defines the minimum frequency, and kNHigh defines the maximum frequency. Parameter mToneFrameCount is a counter that represents how many consecutive frames meet the requirements of network tone. Parameter kNumToneFrames is a threshold value. T_Flag is a detected flag, where value of 1 means the current frame is considered to have network tone; otherwise, the current frame is considered not to have network tone.

In one embodiment, as shown in FIG. 7, network tone can be detected in the following manner. In a process block 252, the bin having the maximum value for PowX(k) (k=1 to 64 in the example configuration) can be identified, and the corresponding bin number k can be denoted as mInPsdMaxIndex. An absolute value (256) of the difference (254) between mInPsdMaxIndex and oldInPsdMaxIndex is indicated as "A." Thus, A=|mInPsdMaxIndex−oldInPsdMaxIndex|. A product (258) of mInPsdMaxIndex and mMaxPsdRatio is indicated as "B." Thus, B=mInPsdMaxIndex*mMaxPsdRatio.

In a decision block 260, following conditions are checked: (A<B) and (kNLow<=mInPsdMaxIndex<=kNHigh). The condition (A<B) checks to see how much the current bin having the maximum value has changed from the previous bin. The condition (kNLow<=mInPsdMaxIndex<=kNHigh) checks to see if the maximum-value bin is within the known network tone frequency range.

If both conditions are met, the current frame is considered to have a network tone, and the frame counter mToneFrameCount is incremented by 1 (264). Otherwise, the current frame is considered not to have a network tone, and the frame counter mToneFrameCount is reset to zero (262).

Decision block 266 determines whether to set T_Flag as "1" (network tone present in the signal) or "0" (network tone not present in the signal). T_Flag is set to "1" (268) if mToneFrameCount>=kNumToneFrames, and "0" (270) otherwise. For both cases, the current value of mInPsdMaxIndex is set to be the old value oldInPsdMaxIndex (272) for the analysis of the next frame.

In one embodiment, the following values can be used: mMaxPsdRatio=0.21; kNumToneFrames=19; kNLow=2 and kNHigh=15 (for the example 128-FFT).

Figure 8:
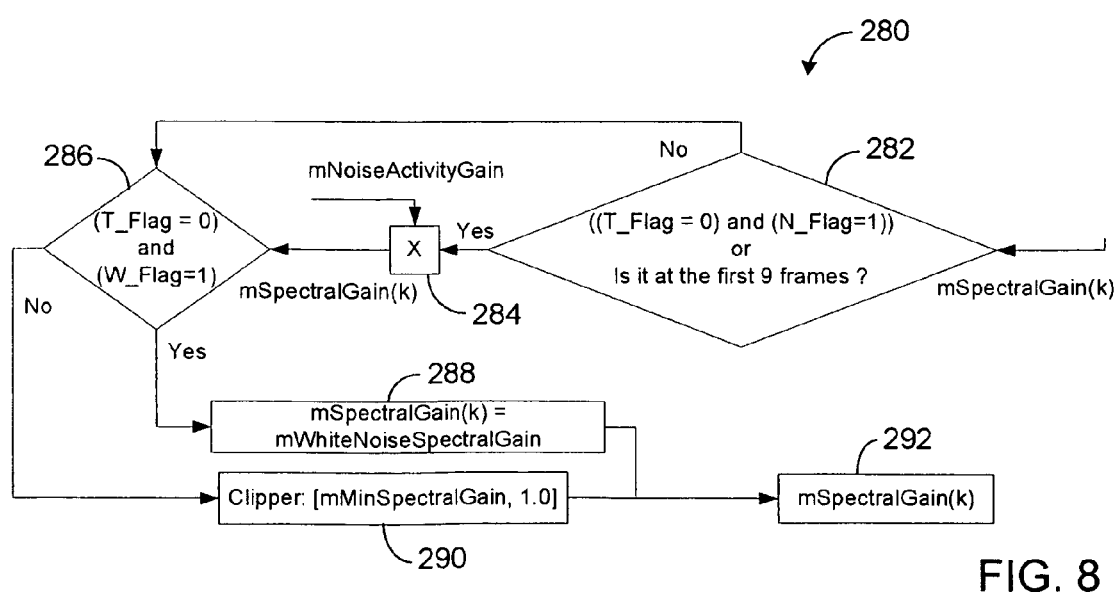
FIG. 8 shows that in one embodiment, results from different detector components can be used to determine an adjustment power spectrum that can be applied to the signal.

FIG. 8 shows one embodiment (280) of the example of the detection-based determination of gains referred to above in reference to FIG. 3. mSpectralGain(k) is a gain for the k-th bin that can be applied to the same bin of the noise power spectrum estimated in block 164 of FIG. 3. mSpectralGain(k) is shown to be adjusted based on the result of a decision block 282, where the following conditions are tested: ((T_Flag=0) and (N_Flag=1)) or (Is the current frame at the first M frames?). In one embodiment, M=9.

If the answer to the decision block 282 is "Yes," mSpectralGain(k) is scaled (284) by a factor mNoiseActivityGain (in one example, 0.2<mNoiseActivityGain<=1.0). In one embodiment, mNoiseActivityGain has a value of about 0.50. Then, another set of conditions are tested in a decision block 286. If the answer to the decision block 282 is "No," the decision block 286 is invoked directly.

The decision block tests the following conditions: (T_Flag=0) and (W_Flag=1). If the answer is "Yes," mSpectralGain(k) is assigned a value mWhiteNoiseSpectralGain that can be estimated as mMinSpectralGain*mGainW (288). In one embodiment, mMinSpectralGain has a value of about 0.25, and mGainW has a value of about 0.891. If the answer is "No," mSpectralGain(k) is subjected to a clipper 290 in the following example manner. If mSpectralGain(k) is less than mMinSpectralGain, then mSpectralGain(k)=mMinSpectralGain; if mSpectralGain(k) is larger than 1.0, then mSpectralGain(k)=1.0 for all values of k (in this example, 1 to 64).

Figure 9:
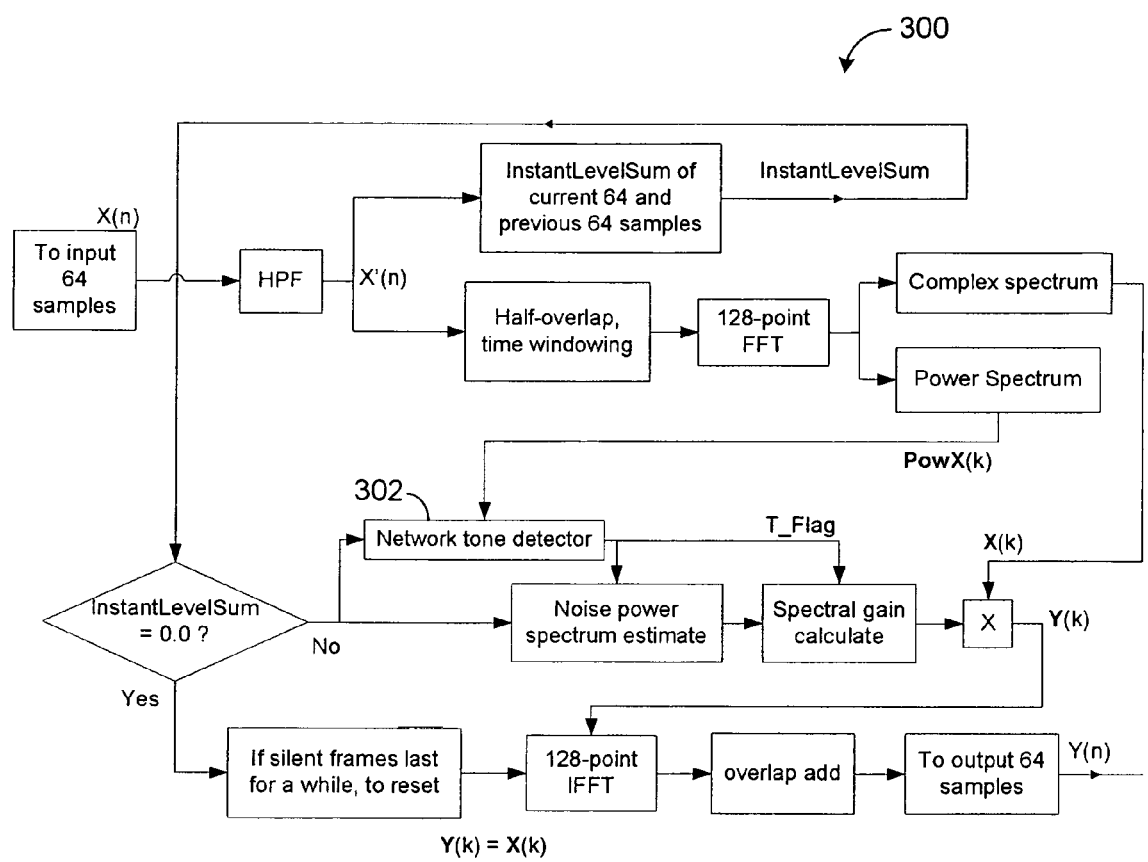
FIG. 9 shows another example embodiment of the system of FIG. 1.

FIG. 9 shows that in one embodiment, a system 300 can be configured similar to the system 100 described above. The system 300 is shown to have a network tone detector 302 that can provide the T_Flag for decision making, where such flag is determined based on the power spectrum PowX(k). As with the example system 100, the decision making can involve selected spectral gain adjustment based on the presence or absence of the network tone. In one embodiment, a decision making process similar to that of FIG. 8 can be used—where decisions are made based on T_Flag but not on other detector flag(s)—to determine different values for spectral gain adjustment.

Based on the foregoing, one can see that the spectral gain to be applied in each frequency bin can depend on not only the noise power estimation, but also one or more detections and their corresponding decisions. Although white noise, noise activity, and network tone were discussed as examples, other types of noises—such as residual noise, strong noise, moderate noise, and weak noise—can be handled as well. With information fusion of these decisions, the total decision error can be reduced or minimized and an improved or optimized filtering gain can be obtained for a given system.

By implementing various combinations of the features of the present disclosure, very good voice quality can be obtained, with effective noise suppression of 12-20 dB for stationary noise (adjustable suppression amount), since the gain used in spectral filtering is not simply from noise estimation but can be determined by integration of the noise power estimation with other one or more detections and their corresponding decisions.

Moreover, the following are some non-limiting notable features of the present disclosure: (1) various features of the present disclosure are generally input level independent, and thus, information from detection(s) and decision(s) can be used to normalize related power estimation(s); (2) various features of the present disclosure are generally can avoid the distortions associated with AGC (automatic gain control, where signal-to-noise ratio of the input signal is changed before noise reduction processing applied); (3) computational complexity can be low, since the techniques of the present disclosure are based on power spectrum, instead of magnitude spectrum used in many other available NR systems (including the computation-intensive AGC); (4) network tone can be preserved in the receive path of phone applications, since an effective network tone detection and related functionalities are provided; (5) rapid and adjustable convergence time, flexible controllability, re-convergence, and initial convergence can be achieved, since various associated parameters can be adaptively changed according to various decision results.

In one embodiment, one or more of the features described herein can also be implemented in multi-channel communication systems. In multi-channel case, the information fusion can be made among not only multi-detection of one channel, but also among multi-channels.

With respect to the network tone detector, following can be noted. If network tone appears, the noise reduction scheme can treat input as useful signal and switch to use different spectral gains so as to keep the network-tone unreduced. With this, the noise reduction scheme can not only increase SNR, but also keep the network tone information available during other available noise reduction algorithms.

Also, because the network tone detector is based on spectra that are available in spectral subtraction based noise reduction algorithms, no extra computation is needed to obtain power (or magnitude) spectrum. As a result, the network tone detector can be simple and be easily implemented many applications. Moreover, the network tone detector can be simply added to existing signal-channel noise reduction schemes. Moreover, the network tone detector and related algorithm(s) can be generalized to integration of frequency-domain based echo cancellation schemes found in some telephone systems. Also, the technique can also be used for signaling detectors, etc.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A system for reducing audio noise, comprising:
an input component configured so as to receive an input time-domain signal and generate an input frequency-domain signal and a power spectrum of said input frequency-domain signal, wherein said power spectrum comprises N frequency bins corresponding to N sampled values of said input time-domain signal;
a noise-activity detector configured to:
partition said N frequency bins of the power spectrum into a plurality of bands,
obtain a magnitude value for a selected number of said plurality of bands,
compare said magnitude value with a threshold value for said selected number of bands, and
determine that said noise activity is present in said power spectrum in response to determining that said magnitude value exceeds said threshold value for said selected number of bands;
a white noise detector configured to:
obtain a current energy value based on a sum of said N frequency bins,
obtain a difference between said current energy value from a previous energy value, said difference having a positive value, and generate a white noise indicator indicating presence of white noise in said power spectrum if said difference is greater than a selected value;
a network tone detector configured to:
identify a selected bin having a maximum value from said N frequency bins, and
generate a network tone indicator indicating presence of network tone in said power spectrum if said selected bin has not changed by more than a selected amount and if said selected bin is within a range of frequency corresponding to said network tone;
an adjustment component configured so as to:
generate an adjustment power spectrum based on detection of said presence of said noise activity, white noise, and network tone, said generating the adjustment power spectrum comprising:
scaling said power spectrum by a selected amount if said network tone is not detected by said network tone detector and said noise activity is detected by said noise-activity detector,
adjusting said power spectrum for said white noise in place of said scaling if said network tone is not detected by said network tone detector and said white noise is detected by said white noise detector, and
if said white noise is not detected by said white noise detector, clipping a gain associated with said scaling if the gain is below a minimum gain or above a maximum gain;
combine said adjustment power spectrum with said input frequency-domain signal so as to generate an output frequency-domain signal; and
an output component configured so as to generate an output time-domain signal based on said output frequency-domain signal.

2. The system of claim 1, wherein said input time-domain signal comprises a speech communication signal.

3. The system of claim 1, further comprising a re-convergence component configured so as to allow by-passing of said at least one detection component and said adjustment component based on said input time-domain signal.

4. The system of claim 3, wherein said by-passing is performed if a selected value representative of said input time-domain signal remains less than a threshold value for a selected period of time.

5. The system of claim 4, wherein said threshold value is substantially zero.

6. The system of claim 1, wherein the system is implemented by one or more processors.

7. A method for reducing audio noise, comprising: by one or more processors:
   receiving an input time-domain signal and generating an input frequency-domain signal and a power spectrum of said input frequency-domain signal, wherein said power spectrum comprises N frequency bins corresponding to N sampled values of said input time-domain signal;
   detecting noise activity in the power spectrum, said detecting the noise activity comprising:
      partitioning said N frequency bins of the power spectrum into a plurality of bands,
      obtaining a magnitude value for a selected number of said plurality of bands,
      comparing said magnitude value with a threshold value for said selected number of bands, and
      determining that said noise activity is present in said power spectrum in response to determining that said magnitude value exceeds said threshold value for said selected number of bands;
   detecting white noise in the power spectrum, said detecting the white noise comprising:
      obtaining a current energy value based on a sum of said N frequency bins,
      obtaining a difference between said current energy value from a previous energy value, said difference having a positive value, and
      generating a white noise indicator indicating presence of the white noise in said power spectrum if said difference is greater than a selected value;
   detecting a network tone in the power spectrum, said detecting the network tone comprising:
      identifying a selected bin having a maximum value from said N frequency bins, and
      generating a network tone indicator indicating presence of the network tone in said power spectrum if said selected bin has not changed by more than a selected amount and if said selected bin is within a range of frequency corresponding to said network tone;
   generating an adjustment power spectrum based on detection of said presence of said noise activity, white noise, and network tone, said generating the adjustment power spectrum comprising:
      scaling said power spectrum by a selected amount if said network tone is not detected by said network tone detector and said noise activity is detected by said noise-activity detector,
      adjusting said power spectrum for said white noise in place of said scaling if said network tone is not detected by said network tone detector and said white noise is detected by said white noise detector, and
      if said white noise is not detected by said white noise detector, clipping a gain associated with said scaling if the gain is below a minimum gain or above a maximum gain;
   combining said adjustment power spectrum with said input frequency-domain signal so as to generate an output frequency-domain signal; and
   generating an output time-domain signal based on said output frequency-domain signal.

8. The method of claim 7, wherein said input time-domain signal comprises a speech communication signal.

9. The method of claim 7, further comprising by-passing of said detecting based on said input time-domain signal.

10. The method of claim 9, wherein said by-passing is performed if a selected value representative of said input time-domain signal remains less than a threshold value for a selected period of time.

11. The method of claim 10, wherein said threshold value is substantially zero.

12. A system for reducing audio noise, the system comprising:
   an input component configured to receive an input time-domain signal and to generate an input frequency-domain signal and a power spectrum of said input frequency-domain signal;
   a noise-activity detector configured to detect noise activity in said power spectrum;
   a white noise detector configured to generate a white noise indicator indicating presence of white noise in said power spectrum;
   a network tone detector configured to generate a network tone indicator indicating presence of network tone in response to detecting a network tone in said power spectrum;
   an adjustment component configured to:
      generate an adjustment power spectrum based on detection of said presence of said noise activity, white noise, and network tone, said generating the adjustment power spectrum comprising:
         scaling said power spectrum by a selected amount if said network tone is not detected by said network tone detector and said noise-activity is detected by said noise-activity detector,
         adjusting said power spectrum for said white noise in place of said scaling if said network tone is not detected by said network tone detector and said white noise is detected by said white noise detector, and
         if said white noise is not detected by said white noise detector, clipping a gain associated with said scaling if the gain is below a minimum gain or above a maximum gain;
      combine said adjustment power spectrum with said input frequency-domain signal to generate an output frequency-domain signal; and
   an output component configured to generate an output time-domain signal based on said output frequency-domain signal.

13. The system of claim 12, wherein the system is implemented by one or more processors.

14. The system of claim 12, wherein said power spectrum comprises N frequency bins corresponding to N sampled values of said input time-domain signal.

15. The system of claim 14, wherein said noise-activity detector is configured to compare magnitudes of one or more groups said N frequency bins with corresponding selected values and generate a noise-activity indicator indicating presence or absence of noise activity in said power spectrum.

16. The system of claim 15, wherein said noise-activity detector is configured to:
   partition said N frequency bins into a plurality of bands;

obtain a magnitude value for each of said plurality of bands;

compare said magnitude value with a threshold value for each of said plurality of bands; and determine presence of said noise activity if said magnitude value exceeds said threshold value for a selected number of said plurality of bands.

17. The system of claim 14, wherein said white-noise detector is configured to:

obtain a current energy value based on a sum of said N frequency bins;

obtain a difference between said current energy value from a previous energy value, said difference having a positive value; and generate a white-noise indicator indicating presence of white noise in said power spectrum if said difference is greater than a selected value.

18. The system of claim 14, wherein said network-tone detector is configured to:

identify a selected bin having the maximum value from said N frequency bins; and generate a network-tone indicator indicating presence of network tone in said power spectrum if said selected bin satisfies one or more conditions.

19. The system of claim 18, wherein said network-tone indicator is generated if said selected bin has not changed by more than a selected amount and if said selected bin is within a range of frequency corresponding to said network tone.

* * * * *